(12) United States Patent
Morille et al.

(10) Patent No.: US 11,247,590 B2
(45) Date of Patent: Feb. 15, 2022

(54) COMPOSITE STRUCTURE WITH REINFORCED LINK

(71) Applicant: FAURECIA SYSTEMES D'ECHAPPEMENT, Nanterre (FR)

(72) Inventors: Nicolas Morille, Saint Jouan des Guéret (FR); Gwenaël Lelan, Saint Malo (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/983,011

(22) Filed: Aug. 3, 2020

(65) Prior Publication Data

US 2021/0039531 A1    Feb. 11, 2021

(30) Foreign Application Priority Data

Aug. 5, 2019  (FR) ..................... 19 08972

(51) Int. Cl.
*B60N 2/58* (2006.01)
*B29C 70/86* (2006.01)
(Continued)

(52) U.S. Cl.
CPC ............... *B60N 2/58* (2013.01); *B29C 70/86* (2013.01); *B32B 3/266* (2013.01); *B32B 5/024* (2013.01);
(Continued)

(58) Field of Classification Search
CPC . B60N 2/58; B60N 2/22; B60N 2/682; B60N 2/686; B29C 70/86; B32B 5/024; B32B 5/10; B32B 5/26; B32B 15/14; B32B 15/18; B32B 2262/02; B32B 2262/101; B32B 2262/106; B32B 2605/00; B29L 2031/771; B29L 2031/3055
(Continued)

(56) References Cited

U.S. PATENT DOCUMENTS

2012/0223565 A1* 9/2012 Yasui ................ B29C 45/14311
297/452.1
2019/0002106 A1* 1/2019 Stachel .................. B60N 2/682

FOREIGN PATENT DOCUMENTS

DE  102013223834 A1  3/2015
DE  102016011304 A1  3/2018
FR      2949398 A1  3/2011

OTHER PUBLICATIONS

French Search Report dated Jun. 8, 2020.

* cited by examiner

*Primary Examiner* — Mark R Wendell
(74) *Attorney, Agent, or Firm* — Carlson, Gaskey & Olds, P.C.

(57) ABSTRACT

A composite structure comprising a substantially planar portion and a border arranged on the border of the substantially planar portion. A first linking zone arranged at one end of the border along a first axis and able to accommodate a first metal insert and a second linking zone arranged at another end of the border along the first axis and able to accommodate a second metal insert symmetrical to the first metal insert. An insert comprises a substantially planar base arranged perpendicular to the first axis and comprising, substantially at a center of the substantially planar base, a piercing. A first substantially planar wing is arranged perpendicular to the substantially planar base and a second substantially planar wing arranged perpendicular to the substantially planar base and the first substantially planar wing.

20 Claims, 6 Drawing Sheets

(51) Int. Cl.
*B32B 3/26* (2006.01)
*B32B 5/02* (2006.01)
*B32B 5/10* (2006.01)
*B32B 5/26* (2006.01)
*B32B 15/14* (2006.01)
*B60N 2/22* (2006.01)
*B60N 2/68* (2006.01)
B29L 31/30 (2006.01)
B29L 31/00 (2006.01)
B32B 15/18 (2006.01)

(52) U.S. Cl.
CPC ............... *B32B 5/10* (2013.01); *B32B 5/26* (2013.01); *B32B 15/14* (2013.01); *B60N 2/22* (2013.01); *B60N 2/682* (2013.01); *B60N 2/686* (2013.01); B29L 2031/3055 (2013.01); B29L 2031/771 (2013.01); B32B 15/18 (2013.01); B32B 2262/02 (2013.01); B32B 2262/101 (2013.01); B32B 2262/106 (2013.01); B32B 2605/00 (2013.01)

(58) Field of Classification Search
USPC .................................................... 297/452.18
See application file for complete search history.

COMPOSITE STRUCTURE WITH REINFORCED LINK

CROSS-REFERENCE TO RELATED APPLICATIONS

This application is a U.S. non-provisional application claiming the benefit of French Application No. 19 08972, filed on Aug. 5, 2019, which is incorporated herein by reference in its entirety.

TECHNICAL FIELD

The disclosure relates to the field of composite structures, such as automobile seat carcasses, and more particularly relates to a link between two such structures, such as a link between a seat bottom structure and a backrest structure, and the reinforcement of this link to withstand a crash.

BACKGROUND

It is known to produce a composite structure, for example to form a carcass for an automobile seat backrest, comprising a substantially planar portion, forming the backrest, and a border, arranged on the border of the portion. The border comprises a first linking zone arranged at one end of the border along a first axis and is able to accommodate a first metal insert and a second linking zone arranged at the other end of the border along the first axis and able to accommodate a second metal insert, each of the two inserts being able to accommodate a hub, the two hubs being coaxial along the first axis so as to make it possible to form a link of the structure relative to another structure, such as a seat bottom, around the first axis.

The problem that such a composite structure encounters is its resistance to crash test(s). For an automobile seat, the first axis is arranged along an axis Y transverse to the vehicle, the seat bottom is substantially horizontal, in a plane XY, and the backrest is articulated between a usage position where it is substantially vertical, in a plane YZ, and a storage position where it is folded forward against the seat bottom, in a plane XY. The main anticipated direction of impact is along the axis X of the vehicle, from the rear. Such an impact is indicative of contents of the trunk compartment striking the back of the seat.

SUMMARY

In order to reinforce such a composite structure, the disclosure implements several complementary features.

The disclosure relates to a composite structure, such as a carcass for an automobile seat backrest, comprising a substantially planar portion and a border, arranged on the border of the substantially planar portion and comprising a first linking zone arranged at one end of the border along a first axis and able to accommodate a first metal insert and a second linking zone arranged at another end of the border along the first axis and able to accommodate a second metal insert symmetrical to the first metal insert, each of the first and second metal inserts being able to accommodate a hub, the hubs being coaxial along the first axis so as to make it possible to form a link of the composite structure relative to another structure, such as a seat bottom, around the first axis, where an insert comprises a substantially planar base, arranged perpendicular to the first axis and comprising, substantially at a center of the substantially planar base, a piercing able to accommodate a hub, a first substantially planar wing arranged perpendicular to the substantially planar base and a second substantially planar wing arranged perpendicular to the substantially planar base and the first substantially planar wing.

Specific features or embodiments, usable alone or in combination, are:
the first substantially planar wing is arranged parallel to a plane of the substantially planar portion and extends perpendicular to a periphery of the substantially planar base toward an inside of the composite structure,
the second substantially planar wing extends perpendicular to the periphery of the substantially planar base toward an outside of the composite structure,
the composite structure further comprises at least one organo (preimpregnated with continuous fibers and thermoplastic) arranged on an outer surface of the border substantially parallel to the plane of the substantially planar portion, preferably longitudinally along the first axis and still more preferably over the surface opposite an anticipated direction of impact, where the first substantially planar wing is arranged between the organo and the surface,
a face of the first substantially planar wing opposite the organo comprises a texture and/or protuberances,
a face of the substantially planar base and/or of the first substantially planar wing and/or of the second substantially planar wing comprises a texture, preferably made by laser machining,
a face of the substantially planar base and/or of the first substantially planar wing and/or of the second substantially planar wing comprises at least one hole, able to allow an overmolding thermoplastic reinforced with cut fibers to pass.

In a second aspect of the disclosure, a seat comprising such a structure.

In a third aspect of the disclosure, a vehicle comprising such a seat.

BRIEF DESCRIPTION OF THE DRAWINGS

The disclosure will be better understood upon reading the following description, provided solely as an example, and in reference to the appended figures, in which.

DETAILED DESCRIPTION OF THE DRAWINGS

Figure 1:
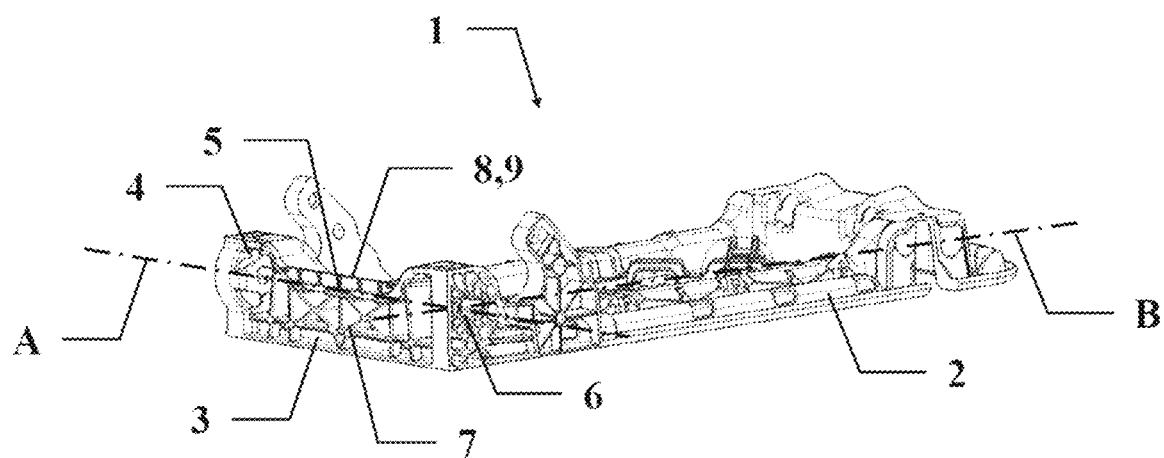
FIG. 1 shows, in perspective view, a composite structure according to the disclosure.
Figure 2:
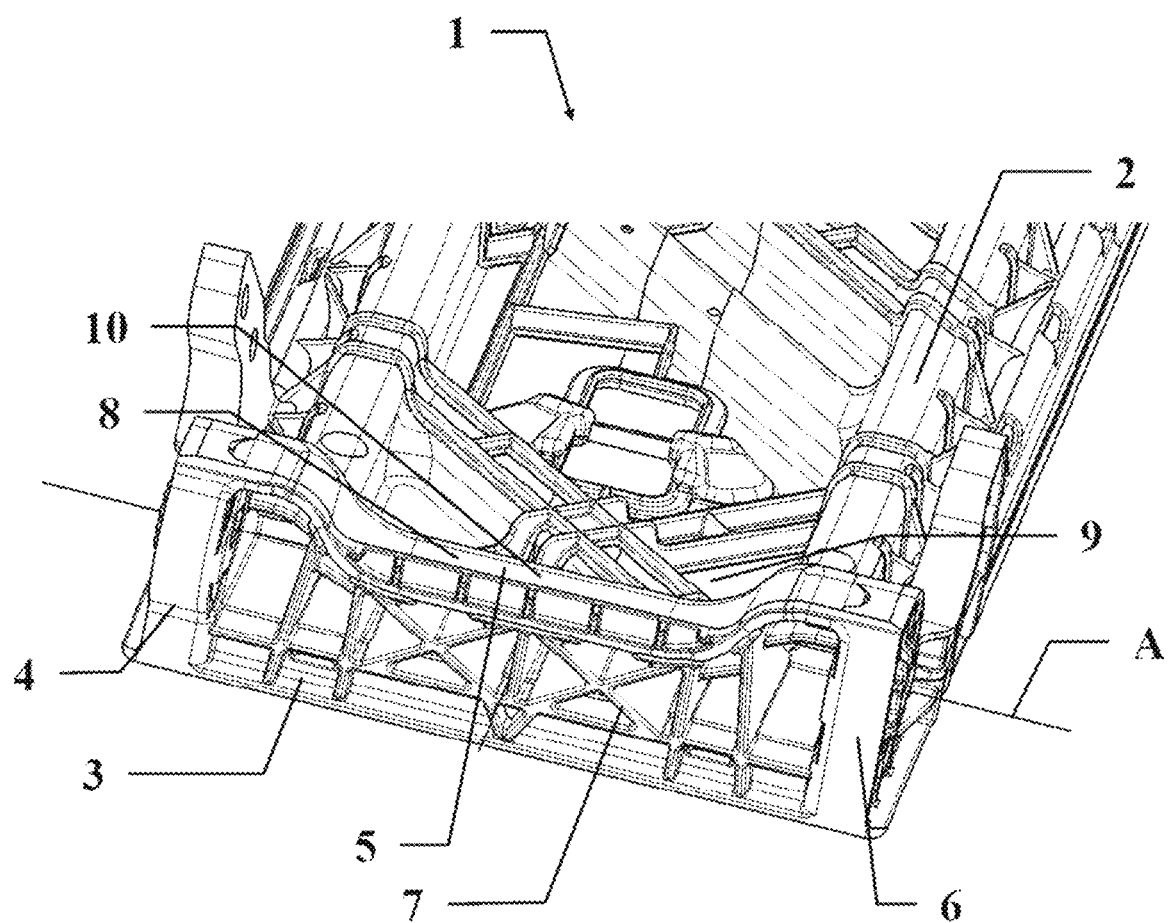
FIG. 2 shows, according to another perspective view, the structure of FIG. 1.

In reference to FIG. 1, the composite structure 1, here a carcass for an automobile seat backrest, comprises a portion 2, covering the entire straight part, substantially planar, and a border 3, covering a portion that is as wide as it is high around the axis A. The border 3 is arranged on the border, or on one of the edges, for example here a small edge, of the portion 2. The border 3 can, along the axis A, be divided into a first linking zone 4, covering the portion of the border 3, arranged, along the axis A, at one end of the border 3, here the left end in the plane of the figure. This first linking zone 4 is configured to accommodate a first metal insert 11 able to accommodate a hub (not shown) with an axis combined with the axis A. The border 3 can further be divided into a second linking zone 6, covering the portion of the border 3, arranged, along the axis A, at the other end of the border 3, here the right end in the plane of the figure. This second linking zone 6 is configured to accommodate a second metal insert 12, advantageously symmetrical to the first metal insert 11 relative to a plane perpendicular to the axis A, able to accommodate a hub (not shown) with an axis combined with the axis A and coaxial with the first hub. The two hubs are coaxially aligned with one another and with the axis A so as to make it possible to link the structure 1 relative to another structure (not shown), such as a seat bottom, around the axis A.

A reinforcing zone 5 connects the two linking zones 4, 6.

Figure 5:
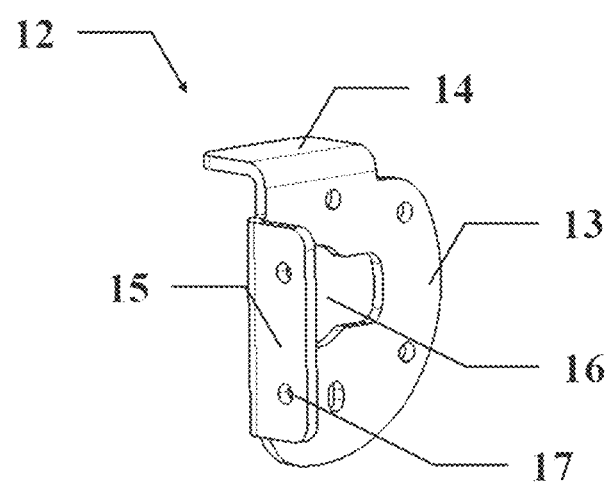
FIG. 5 shows, in perspective view, a metal insert.
Figure 6:
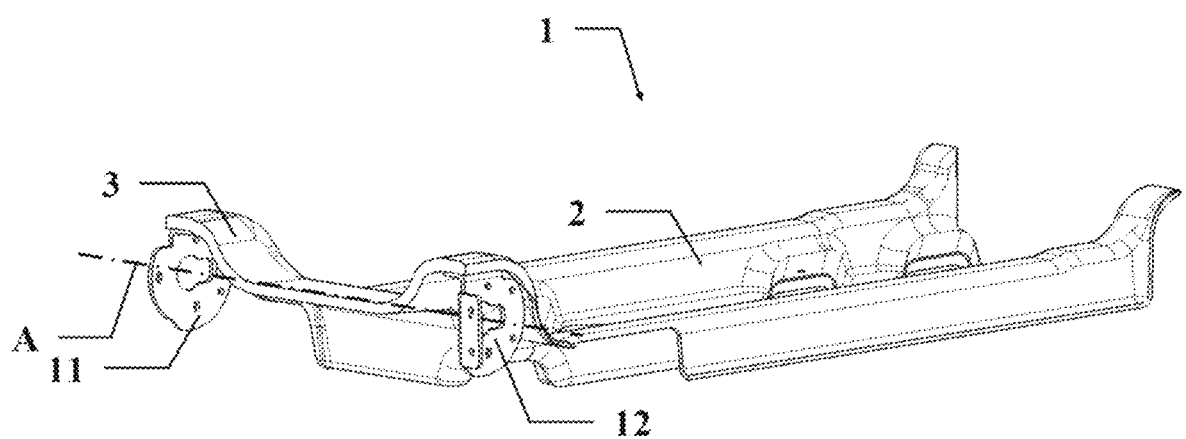
FIG. 6 shows, in perspective view, the metal insert of FIG. 5 in position in the structure.

According to one feature, more specifically visible in FIG. 5, an insert 11, 12 comprises a substantially planar base 13, arranged, as more particularly shown in FIG. 6, perpendicular to the first axis A. The base 13 comprises, substantially at its center, a piercing 16 able to accommodate a hub. The insert 11, 12 further comprises a first substantially planar wing 14 arranged perpendicular to the base 13 and a second substantially planar wing 15 arranged perpendicular to the base 13 and to the first wing 14. The insert 11, 12 thus has a three-dimensional shape and its three perpendicular planes make it possible, after embedding of the metal insert 11, 12 in the thermoplastic of the structure 1, to offer very solid anchoring and thus good resistance to a crash force.

According to another feature, the first wing 14 is arranged parallel to the plane of the portion 2. It begins at the periphery of the base 13 and extends perpendicular to the periphery of the base 13 toward the inside of the structure 1, or toward the other metal insert 11, 12. The first wing 14 can thus advantageously be made integrally with the base 13 by bending.

According to another feature, the second wing 15 begins at the periphery of the base 13 and extends perpendicular to the periphery of the base 13 toward the outside of the structure 1. The second wing 15 can thus advantageously be made integrally with the base 13 by bending.

According to another feature, the structure 1 further comprises at least one organo 8 arranged on an outer surface 10 of the border 3, substantially parallel to a plane containing the first axis A and the second axis B, or the plane of the portion 2. This organo 8 is preferably arranged longitudinally along the first axis A, over the length of the border 3.

According to another feature, the first wing 14 is arranged between the organo 8 and the surface 10. This makes it possible to ensure a continuity of the reinforcement. The organo 8 ensures a reinforcement of the border 3. The superposition of the first wing 14 and the organo 8 makes it possible to connect the border 3 and the metal insert 11, 12 in order to offer an overall reinforcement to the structure 1.

Figure 3:
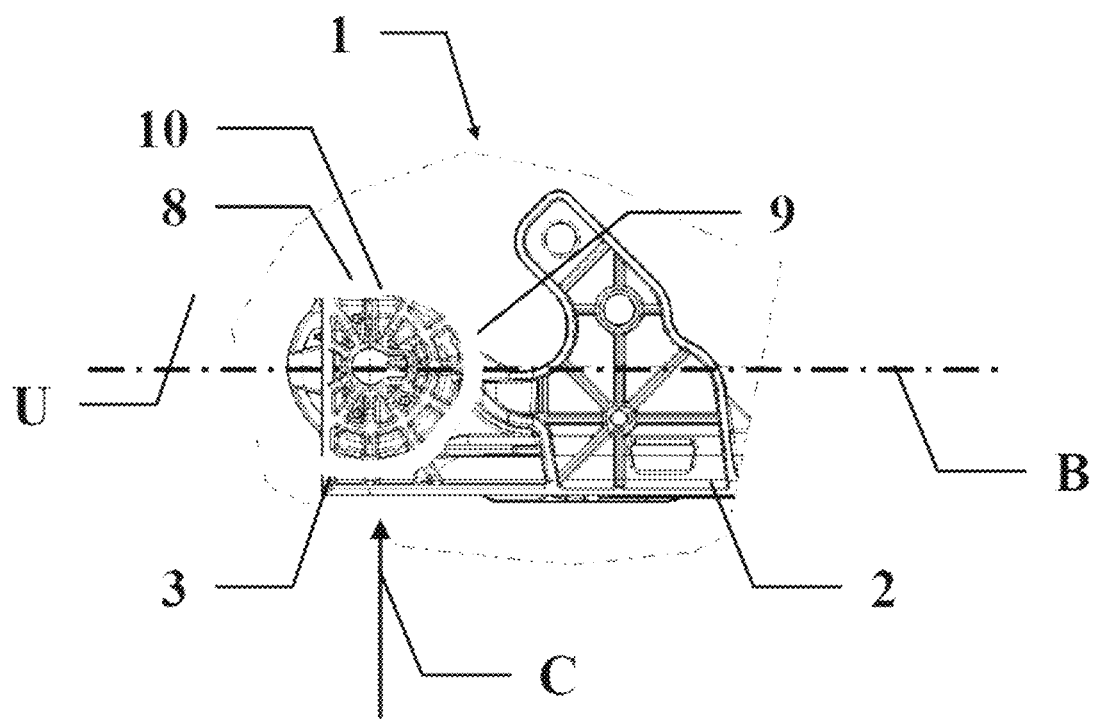
FIG. 3 shows, in partial cut profile view, the structure of FIG. 1.
Figure 4:
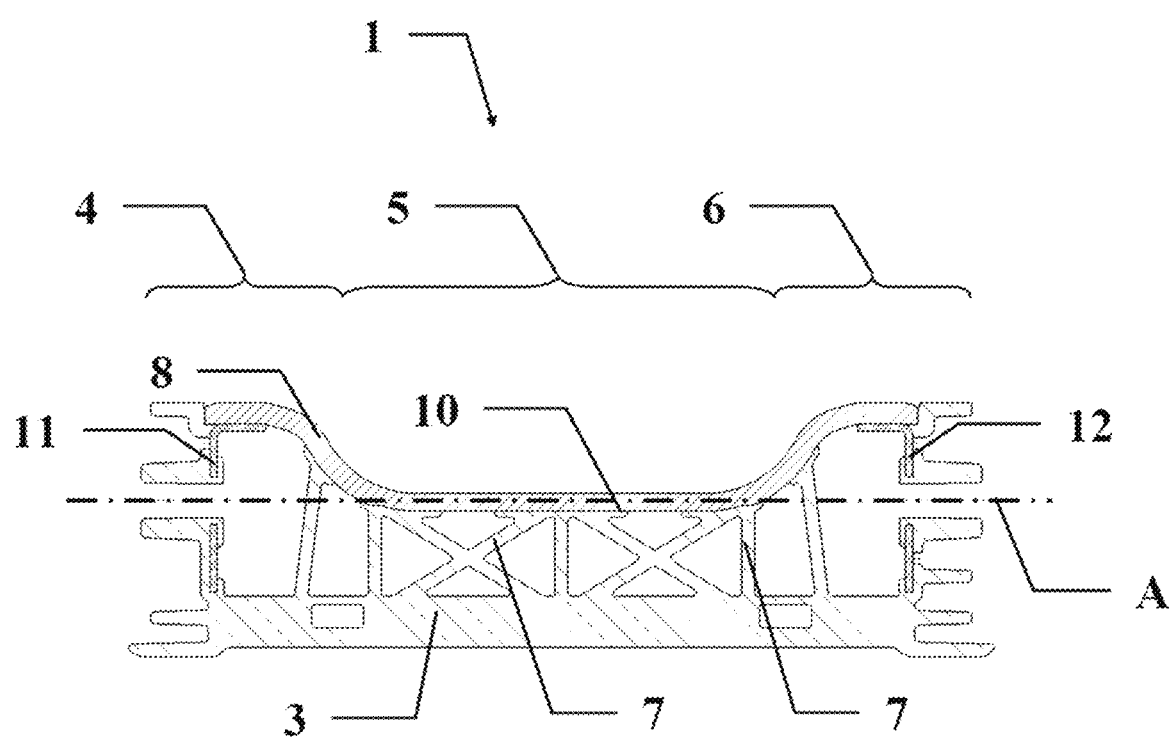
FIG. 4 shows, in sectional top view, the structure of FIG. 1.

The surface 10 is preferably the surface opposite an anticipated direction of impact C, as more specifically shown in FIG. 3. An impact along the direction C over a surface of the border 3 leads to tensile stresses on the opposite surface 10. Therefore, an organo 8, which primarily provides a tensile resistance, here is particularly suitable, on the surface 10 opposite the impact C.

According to another feature, the face of the first wing 14 opposite the organo 8 comprises a texture and/or protuberances, such as spurs. This makes it possible to increase the assembly force between the metal insert 11, 12 and the organo 8.

According to another feature, a face of the base 13 and/or of the first wing 14 and/or of the second wing 15 comprises a texture, preferably made by laser machining. This makes it possible to increase the adherence of the thermoplastic on the face and thus to contribute to increasing the strength of the structure 1.

According to another feature, a face of the base 13 and/or of the first wing 14 and/or of the second wing 15 comprises at least one hole 17, able to allow an overmolding thermoplastic to pass by fusion, during the molding, this thermoplastic being reinforced with cut fibers. This makes it possible to increase the anchoring of the thermoplastic with the face and thus to contribute to increasing the strength of the structure 1.

In a known manner, an organo 8, 9 or insert made from continuous fiber reinforced thermoplastic (CFRT) is a composite part with thermoplastic matrix reinforced with continuous fibers, advantageously woven, so as to form one or several mats. This organo is prefabricated, or made before the molding of the structure 1. It can be a preformed structure or be made flat. It is next inserted, preferably hot in order to be malleable, in the production mold of the structure 1 so as to be able to conform to and marry the surface of the mold.

Likewise, the metal inserts 11, 12 are placed in the mold before thermoplastic injection. The rest of the composite 1 is next made by injecting into the mold, against or around the organo(s) 8, 9, and the metal inserts 11, 12, a "conventional" thermoplastic, in that it is reinforced with cut fibers.

According to another feature, the fibers, both those of the conventional thermoplastic and those of the organos 8, 9, are preferably glass fibers.

The thermoplastic, both the conventional one and that of the organos 8, 9, can be any thermoplastic such as PA6, PA66, PP, PET, PPS, PPA, etc.

The disclosure further relates to an automobile seat comprising at least one such composite structure 1.

The disclosure further relates to a vehicle comprising at least one such seat.

The disclosure has been illustrated and described in detail in the drawings and the preceding description. The latter must be considered to be illustrative and provided as an example, and not as limiting the disclosure to this description alone. Many embodiment variants are possible.

LIST OF REFERENCE SIGNS

1: composite structure,
2: portion,
3: border,
4: first linking zone,
5: reinforcing zone,
6: second linking zone,
7: rib,
8, 9: organo,
10: outer surface,
11, 12: metal insert,
13: base,
14: first wing,
15: second wing,
16: piercing,
17: hole.

The invention claimed is:

1. A composite structure, such as a carcass for an automobile seat backrest, comprising:
  a substantially planar portion;

a border arranged on a periphery of the substantially planar portion;

a first linking zone arranged at one end of the border along a first axis and able to accommodate a first metal insert and a second linking zone arranged at another end of the border along the first axis and able to accommodate a second metal insert symmetrical to the first metal insert;

each of the first and second metal inserts being able to accommodate a hub, the hubs being coaxial along the first axis to form a link of the composite structure relative to a second structure around the first axis; and wherein each of the first and second metal inserts comprises a substantially planar base, arranged perpendicular to the first axis and comprising, substantially at a center of the substantially planar base, a piercing able to accommodate the hub, a first substantially planar wing arranged perpendicular to the substantially planar base and a second substantially planar wing arranged perpendicular to the substantially planar base and the first substantially planar wing.

2. The structure according to claim 1, where the first substantially planar wing is arranged parallel to a plane of the substantially planar portion and extends perpendicular to a periphery of the substantially planar base toward an inside of the composite structure.

3. The structure according to the claim 1, where the second substantially planar wing extends perpendicular to a periphery of the substantially planar base toward an outside of the composite structure.

4. The structure according to the claim 1, further comprising at least one organo arranged on an outer surface of the border substantially parallel to a plane of the substantially planar portion, where the first substantially planar wing is arranged between the at least one organo and the outer surface, the at least one organo being an insert made from thermoplastic reinforced with continuous fibers.

5. The structure according to claim 4, where a face of the first substantially planar wing opposite the at least one organo comprises a texture and/or protuberances.

6. The structure according to the claim 4, where the at least one organo is arranged longitudinally along the first axis.

7. The structure according to the claim 4, where the at least one organo is arranged over a surface opposite an anticipated direction of impact.

8. The structure according to claim 1, where a face of the substantially planar base and/or of the first substantially planar wing and/or of the second substantially planar wing comprises a texture.

9. The structure according to claim 8, where said texture is made by laser machining.

10. The structure according to claim 1, where a face of the substantially planar base and/or of the first substantially planar wing and/or of the second substantially planar wing comprises at least one hole able to allow an overmolding thermoplastic reinforced with cut fibers to pass.

11. The structure according to claim 1, wherein the composite structure comprises the automobile seat backrest that is configured to link with the second structure comprising a seat bottom.

12. A seat comprising the composite structure according to the claim 1.

13. A vehicle comprising at least one seat according to claim 12.

14. The structure according to claim 1, wherein the first linking zone includes the first metal insert and the second linking zone includes the second metal insert, and wherein the first end of the border includes a first opening coaxial with the first axis and the second end of the border includes a second opening coaxial with the first axis, and wherein the piercing of the first metal insert is open to the first opening and the piercing of the second metal insert is open to the second openings.

15. The structure according to claim 14, wherein at least a portion of the first metal insert is embedded within a portion of the first end of the border around the first opening, and wherein at least a portion of the second metal insert is embedded within a portion of the second end of the border around the second opening.

16. A composite structure for an automobile seat backrest, comprising:

a substantially planar portion;

a border arranged on a periphery of the substantially planar portion;

a first linking zone arranged at a first end of the border along a first axis and including a first metal insert;

a second linking zone arranged at a second end of the border along the first axis and including a second metal insert symmetrical to the first metal insert;

wherein the first end of the border includes a first opening coaxial with the first axis and the second end of the border includes a second opening coaxial with the first axis;

wherein each of the first and second metal inserts comprises
a substantially planar base, arranged perpendicular to the first axis and comprising, substantially at a center of the substantially planar base, a piercing open to a respective one of the first and second openings,
a first substantially planar wing arranged perpendicular to the substantially planar base, and
a second substantially planar wing arranged perpendicular to the substantially planar base and the first substantially planar wing; and wherein each of the first and second metal inserts is configured to provide a linking interface for a link of the composite structure relative to a second structure around the first axis.

17. The composite structure according to claim 16, wherein at least a portion of the first metal insert is embedded within a portion of the first end of the border around the first opening, and wherein at least a portion of the second metal insert is embedded within a portion of the second end of the border around the second opening.

18. The composite structure according to claim 16, wherein the first substantially planar wing of one of the first and second metal inserts is arranged parallel to a plane of the substantially planar portion and begins at a periphery of the substantially planar base and extends perpendicular to the periphery of the substantially planar base toward the other of the first and second metal inserts.

19. The composite structure according to claim 18, wherein the second wing of the one of the first and second metal inserts begins at the periphery of the substantially planar base and extends perpendicular to the periphery of the base toward an outside of the composite structure.

20. The composite structure according to claim 19, wherein the first wing and the second wing are integrally formed with the substantially planar base as a single-piece structure.

* * * * *